United States Patent [19]

Ikeguchi

[11] 4,404,330

[45] Sep. 13, 1983

[54] CURABLE RESIN COMPOSITION

[75] Inventor: Nobuyuki Ikeguchi, Tokyo, Japan

[73] Assignee: Mitsubishi Gas Chemical Company, Inc., Tokyo, Japan

[21] Appl. No.: 260,993

[22] Filed: May 6, 1981

[30] Foreign Application Priority Data

| May 6, 1980 | [JP] | Japan | 55-59630 |
| Jun. 9, 1980 | [JP] | Japan | 55-77384 |
| Feb. 5, 1981 | [JP] | Japan | 56-16040 |
| Mar. 19, 1981 | [JP] | Japan | 56-39831 |

[51] Int. Cl.³ ............................................. C08F 8/30
[52] U.S. Cl. .............................. 525/374; 525/329.3; 525/167
[58] Field of Search .............. 525/167, 326, 330, 324, 525/329.3

[56] References Cited

U.S. PATENT DOCUMENTS

| 3,448,079 | 6/1969 | Grigat et al. | 260/59 |
| 3,553,244 | 1/1971 | Grigat et al. | 260/453 |
| 3,562,214 | 2/1971 | Leverkusen et al. | 260/47 |
| 3,740,348 | 6/1973 | Grigat et al. | 260/453 AL |
| 3,755,402 | 8/1973 | Grigat et al. | 260/453 AR |
| 4,110,364 | 8/1978 | Gaku et al. | 528/170 |

FOREIGN PATENT DOCUMENTS

| 51-63149 | 6/1976 | Japan . |
| 1060933 | 3/1967 | United Kingdom . |
| 1305967 | 2/1973 | United Kingdom . |

Primary Examiner—Joseph L. Schofer
Assistant Examiner—Bernard Lipman
Attorney, Agent, or Firm—Fleit, Jacobson & Cohn

[57] ABSTRACT

A curable resin composition comprising a mixture and/or a preliminary reaction product of (a) at least one cyanate compound selected from the group consisting of polyfunctional cyanate esters, prepolymers of said cyanate esters, coprepolymers of said cyanate esters and an amine and mixtures thereof, (b) at least one polymeric material selected from the group consisting of terpolymer of acrylonitrile, butadiene and isoprene, copolymers of acrylonitrile and one of butadiene and isoprene, reaction products of the terpolymer or the copolymer and a compound selected from the group consisting of isocyanate compounds, epoxy compounds, acrylates, methacrylates and unsaturated acid anhydrides and the terpolymer or copolymer modified by introducing methacryloyl group, acryloyl group or acid anhydride moiety thereinto and optionally (c) at least one compound selected from the group consisting of polyfunctional maleimides, prepolymers of the maleimides or coprepolymers of the maleimides and an amine is disclosed.

13 Claims, 1 Drawing Figure

Fig. 1

CURABLE RESIN COMPOSITION

BACKGROUND OF THE INVENTION

This invention relates to a curable resin composition from which a cured resin having resistance to chemicals and heat, flexural property, and mechanical property can be prepared.

In the prior art, cured compositions having resistance to heat, chemicals and moisture and mechanical strength can be prepared from a polyfunctional cyanate ester alone or a mixture of a polyfunctional cyanate ester and a polyfunctional maleimide and, optionally epoxy resin. However, such cured resin does not sufficiently flexural strength and elasticity.

When acrylonitrile rubber which has been known as a rubber having heat-resistance and oil-resistance is used as a rubber, it exhibits good heat resistance and adhering property. When acrylonitrile rubber have been used as an adhesive excellent heat resistance of which is required, it does not always give satisfactory results.

SUMMARY OF THE INVENTION

The present inventor carried out research for obtaining a cured resin having excellent heat resistance, flexural property and adhering property. As a result, it was found that when a composition comprising a mixture and/or a preliminary reaction product of (a) a polyfunctional cyanate ester, prepolymer of the cyanate ester or coprepolymer of the cyanate ester and an amine (sometimes hereinunder referred to as component (a) and (b) a polymeric material selected from the group consisting of terpolymer of acrylonitrile, butadiene and isoprene, copolymer of acrylonitrile and one of butadiene and isoprene, reaction products of the terpolymer or the copolymer and a compound selected from the group consisting of isocyanate compounds, epoxy compounds, acrylates, methacrylates and unsaturated acid anhydrides and the terpolymer or the copolymer modified by introducing a methacryloyl group, an acryloyl group or an acid anhydride moiety thereinto (sometimes hereinunder referred to as component (b)) and optionally a polyfunctional maleimide, prepolymer of the maleimide or coprepolymer of the maleimide and an amine (sometimes hereinunder referred to as component (c)) is cured, the resulting cured resin having excellent heat resistance, electrical properties and chemical resistance.

This invention relates to a curable resin composition comprising a mixture and/or a preliminary reaction product of component (a) and component (b). This invention also relates to a curable resin composition comprising a mixture and/or a preliminary reaction product component (a), component (b) and component (c).

DETAILED DESCRIPTION OF THE INVENTION

By polyfunctional cyanate ester is meant a compound having at least two cyanate groups in its molecule. The polyfunctional cyanate ester is represented by the formula wherein R is an aromatic nucleus-containing residue which is selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of wherein $R^1$ and $R^2$ are the same or different and each represents a hydrogen atom or an alkyl group containing 1 to 4 carbon atoms, said aromatic nucleus is optionally substituted by a substituent selected from the group consisting of alkyl groups containing 1 to 4 carbon atoms, alkoxy groups, containing 1 to 4 carbon atoms, chlorine and bromine; m is an integer of 2 to 5, and the cyanate group is always directly bonded to the aromatic nucleus.

Examples of the polyfunctional cyanate ester include dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-diblomo-4-dicyanatophenyl)-propane; bis(4-cyanatophenyl)ester; bis(4-cyanatophenyl)thioether; bis(4-cyanatophenyl)sulfone; tris(4-cyanatophenyl)-phosphite; tris(4-cyanatophenyl)phosphate; bis(3-chloro-4-cyanatophenyl)methane; cyanated novolak derived from novolak cyanated bisphenol type polycarbonate oligomer derived from bisphenol type polycarbonate oligomer and mixture thereof. Other cyanate esters employed in the practice of this invention are given in Japanese Patent Publication Nos. 1928/1966, 4791/1969, 11712/1970 and 4112/1979 and Japanese Patent Publication (laid open) No. 63149/1976 which are incorporated herein for references. The above mentioned cyanate esters may be used as mixtures.

Prepolymers may be used containing a sym-triazine ring which is prepared by the trimerization of the cyanate groups of the cyanate ester, and which have an average molecular weight of at least 400 but no more than 6,000. Such prepolymers can be prepared by polymerizing the above cyanate esters in the presence of, as a catalyst, an acid such as a mineral acid or Lewis acid, a base such as sodium hydroxide, a sodium alcoholate or a tertiary amine, or a salt such as sodium carbonate or lithium chloride.

The polyfunctional cyanate ester can be used in the form of a mixture of the monomer and the prepolymer. For example, many of the commercially available cyanate esters derived from bisphenol A and cyanogen halide are in the form of mixtures of cyanate monomers and prepolymers, and such materials can also be used in the present invention.

A coprepolymer of the cyanate ester and an amine may be used as the cyanate ester component. Example of the amines include meta- or para-phenylenediamine, meta- or para-xylylenediamine, 1,4- or 1,3-cyclohexanediamine, hexahydroxylylenediamine, 4,4'-diaminobiphenyl, bis(4-aminophenyl)methane, bis (4-aminophenyl)ether, bis(4-aminophenyl)sulfone, bis(4-amino-3-methylphenyl)methane, bis(3-chloro-4-aminophenyl)methane, bis(4-amino-3,5-dimethylphenyl)methane, bis(4-aminophenyl) cyclohexane, 2,2-(4-aminophenyl)propane, 2,2-bis(4-amino-3-methylphenyl)propane, 2,2-bis(3,5-dibromo-4-aminophenyl)propane, bis(4-aminophenyl)phenylmethane, 3,4-diaminophenyl-4'-aminophenylmethane and 1,1-bis(4-aminophenyl)-1-phenylethane.

A mixture of prepolymer of the cyanate ester and coprepolymer of the cyanate ester and an amine may be used as mixture.

Terpolymer of acrylonitrile, butadiene and isoprene and copolymers of acrylonitrile and one of butadiene and isoprene (sometimes hereinunder referred to as copolymer for convenient) can be employed as component (b) of this invention. The copolymer may be prepared by copolymerizing 5–55% by weight of acrylonitrile and 95–45% by weight of butadiene and/or isoprene, and optionally an acrylate or a methacrylate. The copolymer is a Mooney viscosity of 0 (liquid at room temperature) −200 (elastic).

Reaction products of the copolymer and an isocyanate, an epoxy compound, an acrylate, a methacrylate or an unsatuated acid anhydride may also be employed as component (b) of this invention.

In general, the reaction product may be prepared by reacting the copolymer, preferably the copolymer having functional groups at its end position, being liquid at room temperature and having a molecular weight of 500–10,000 and more preferably the copolymer having functional groups at its position, being liquid at room temperature and having a molecular weight of 700–5,000 with an isocyanate, and epoxy compound, an acrylate, a methacrylate or a saturated acid anhydride in the present or absent of a solvent.

By isocyanate is meant a compound having at least two isocyanate groups. By epoxy compound is meant a compound having two or more epoxy groups in its molecule, which is known as a heat curable epoxy resin. By acrylate or methacrylate is meant a compound having one or more acryloyl or methacryloyl group in its molecule. By unsaturated acid anhydride is meant a compound having olefinically C-C double bond and acid anhydride moiety.

The non-modified copolymer and the modified copolymer are preferable as component (b) of this invention.

The copolymer modified by introducing an acryloyl group, a methacryloyl group or an acid anhydride moiety thereinto may be employed as component (b) of this invention. The copolymer so modified may be prepared by reacting the copolymer having hydroxyl group, carboxyl group, epoxy group or isocyanate group at its end and/or side position with a compound represented by the formula wherein X is methyl or hydrogen; Y is selected from halogen, hydroxyl group, or organic group having functional group selected from the group consisting of carboxyl, hydroxyl, epoxy, amino isocyanate in which the organic group bonds to the acryloyl or methacryloyl group through ether bond, ester bond, urea bond or amide bond, and l is 1, 2 or 3. For example, the copolymer modified may be prepared by the following reactions: (a) reacting hydroxy, carboxy or epoxy-terminated compound represented by formula (3) with copolymer having hydroxyl, carboxyl or epoxy group in its end and/or side position; (b) reacting hydroxy-containing copolymer with (meth)acrylic halide or (meth)acrylic epoxy ester, such as glycidyl (meth)acrylate in stoichiometric amount, when (meth)acrylic halide is used, the reaction is effected in the presence of an agent linking with an acid, such as a tertiary amine including pyridine; (c) reacting a carboxy-containing copolymer with a hydroxyl or epoxy-containing acrylate or methacrylate; (d) reacting an epoxy-containing copolymer with a hydroxyl-containing acrylate or methacrylate; and (e) reacting an isocyanate-containing copolymer with a hydroxyl-containing acrylate or methacrylate.

The hydroxy, carboxy, epoxy or isocyanate-containing copolymer employed in the above reactions can be prepared by introducing into the copolymer these groups, or by reacting the copolymer with a compound having one of these groups.

Polyisocyanates employed for preparing the isocyanate-containing copolymer or an isocyanate-containing acryloyl or methacryloyl compound include, for example, tolylene diisocyanate, xylylene diisocyanate, and hexamethylene diisocyanate.

Polyhydric alcohols employed for preparing the hydroxyl-containing containing acrylate or methacrylate include, for example, aliphatic, alicyclic or aromatic alcohols having valency of 2-4 and carbon atoms of 2-15, such as ethylene glycol, propylene glycol, 1,4-butanediol, 1,6-hexanediol, glycerin, trimethylol propane, pentaeryhritol, neopentyl glycol and xylylene glycol; and ether type polyhydric alcohols having carbon atoms of 4-20, such as diethylene glycol, triethylene glycol, tetraethylene glycol, polyethylene glycol and polypropylene glycol, and mixtures thereof. Besides the above polyhydric alcohols, addition products of an alkylene oxide, such as ethylene oxide and active hydrogen-containing compound, such as diethanol amine, the above polyhydric alcohol or an amine.

Polyepoxy compounds employed for preparing the epoxy-containing acrylate or methacrylate include, for example, epoxy compounds having valency of 2-6 and carbon atoms of 1-20, such as glycerine glycidylether, ether of diglycidyl phthalate and bisphenol A type diglycidyl ether.

The compounds represented by formula (3) include, for example, acrylates, methacrylates, amide-containing acrylates and amide-containing methacrylates are preferable; and acrylates and methacrylates are more preferable.

Introduction of unsaturated acid anhydride moiety is effected by reacting a copolymer with olefinically C-C double bond of an unsaturated acid anhydride. The unsaturated acid anhydrides include, for example, the compounds represented by the formulas It is believed that the reaction be effected by adding the olefinically C-C double bond of the unsaturated acid anhydride to tertiary carbon in the copolymer. Therefore, it is preferable that butadiene or isoprene moiety of the copolymer have 1,2-double bond in order to effect the reaction. It is thought that the reaction be effected by the following equation:

The preferable component (b) include, for example, copolymer or terpolymer of acrylonitrile and one or two of butadiene and isoprene, and copolymer or terpolymer modified by introducing acryloyl, methacryloyl or acid anhydride moiety thereinto.

The polyfunctional maleimides employed in the present invention are organic compounds having two or more maleimide groups derived from maleic anhydride and a polyamine and are represented by the following general formula wherein R represents divalent to pentavalent aromatic or alicyclic organic group, each of $X^1$ and $X^2$ represents a hydrogen atom, halogen atom or alkyl group, and n represents integer of 2-5.

The maleimides represented by the above formula can be produced by a method known per se which involves reacting maleic anhydride with polyamine to form a maleamide acid, and then dehydro-cyclizing the maleamide acid. Examples of polyfunctional maleimide include 1,3- or 1,4- dimaleimido benzene, 1,3- or 1,4- bis(maleimidomethylene) benzene, 1,3- or 1,4- dimaleimido cyclohexane, 1,3- or 1,4- bis(maleimidomethylene)cyclohexane 4,4'-dimaleimidobiphenyl, bis(4-maleimidophenyl)methane, bis(4-maleimidophenyl)ether, bis(4-maleimidophenyl)sulfone, bis(4-maleimido-3-methylphenyl) methane, bis(4-maleimido-3-chlorophenyl)methane, bis(4-maleimido-3,5-dimethylphenyl)methane, 2,2-bis(4-maleimido-3-methylphenyl)propane, 2,2-bis(4-maleimido-3,5-dibromophenyl)propane, bis(4-maleimidophenyl)phenylmethane, 3,4-dimaleimidophenyl-4'-maleimidophenylmethane, 1,1-bis(4-maleimidophenyl)-1-phenylmethane, and maleimides derived from melamine and addition product of formalin and an aniline in which benzene rings of two or more aniline bond through methylene group.

Aromatic amines are preferable as the starting polyamines. The reason is that the resulting object resin has excellent properties, such as heat-resistance, etc. When the resulting object resins have desirable flexibility and pliability, alicyclic amine alone or combination of the alicyclic amines and other amines may be used. Though secondary amines can be used as the starting amine, the primary amines are preferable.

Amines employed in reaction with cyanate esters for preparing coprepolymers of the cyanate ester and the amine may be profitably used as an amine component for preparing maleimides. In addition to the above-mentioned amines, melamine having striazine ring and polyamines obtained by reaction aniline with formaldehyde, in which two or more benzene rings are bonded through methylene bond, may also be used.

The functional maleimides as mentioned above may be used alone or as a mixture. Also the prepolymer of the maleimide obtained by heating the maleimide in the presence or absence of a catalyst may be used. In addition, coprepolymers of the maleimide and the amine employed for synthesizing the polyfunctional maleimide may be used.

The ratio of component (a) and component (c) is not critical. In general, the ratio by weight component (a) and component (c) may be in the range of from 99:1 to 40:60.

The ratio of component (a) and component (b) is not critical. When preparing heat resistant resin having good adhering property, 1-50% by weight of component (b) and preferably 5-40% by weight of component (b) may be used on the basis of total weight of components (a) and (b) or on the basis of total weight of components (a), (b) and (c) (when component (c) is used). In order to improve heat resistance of cured resin derived from component (b), it is preferable to use 5-50% by weight of component (a) or components (a) and (c) on the basis of total weight of components (a) and (b) or components (a), (b) and (c).

The curable composition of this invention comprises a mixture and/or a preliminary reaction product of component (a) and component (b), and optionally component (c) and optionally other functional group-containing compound (sometimes hereinunder referred to as component (d)). Component (d) includes, for example, (meth)acrylic esters or prepolymers thereof, such as esters of monofunctional or polyfunctional hydroxy compounds and (meth)acrylic acid, epoxy ester of (meth)acrylic acid, and alkenyl ester of (meth)acrylic acid; polyallyl compounds or prepolymers thereof, such as diallyl phthalate, divinylbenzene, diallylbenzene, and trialkenyl isocyanurate, dicyclopentadiene or prepolymer thereof; epoxy resin; polyimide resin; and acid anhydrides, such as maleic anhydride and tetrahydrophthalic anhydride. The resin component may be a mixture of components (a) and (b) and optionally (c) and/or (d); a preliminary reaction product of components (a) and (b), components (a), (b) and (c) or components (a), (b), (c) and (d); a mixture of preliminary reaction product of two or three of components (a), (b), (c) and (d) and the remainder thereof.

The curable composition of this invention may be reticulated by heating it alone to form a cured resin having heat resistance. In general, a catalyst may be used in order to promote crosslinking reaction of the components in the composition.

Examples of the catalysts include imidazoles, such as 2-methylimidazole, 2-undecylimidazole, 2-heptadecyl imidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as N,N-dimethyl benzylamine, N,N-dimethylaniline, N,N-dimethyltoluidine, N,N-dimethyl-p-anisidine, p-halogeno-N,N-dimethylaniline, 2-N-ethylanilino ethanol, tri-n-butylamine, pyridine, quinoline, N-methyl-morpholine, triethanolamine, triethylenediamine, N,N,N',N'-tetramethylbutanediamine, N-methylpiperidine; phenols, such as phenol, cresol, xylenol, resorcine, and phloroglucin; organic metal salts, such as lead naphthenate, lead stearate, zinc naphthenate, zinc octylate, tin oleate, dibutyl tin maleate, manganese naphthenate, cobalt naphthenate, and acetyl acetone iron; and inorganic metal salts, such as stannic chloride, zinc chloride and aluminum chloride; peroxides, such as benzoyl peroxide, lauroyl peroxide, octanoyl peroxide, acetyl peroxide, para-chlorobenzoyl peroxide and di-t-butyl diperphthalate; acid anhydrides, such as maleic anhydride, phthalic anhydride, lauric anhydride, pyromellitic anhydride, trimellitic anhydride, hexahydrophthalic anhydride, hexahydropyromellitic anhydride and hexahydrotrimellitic anhydride; azo compounds, such as azoisobutylonitrile, 2,2'-azobispropane, m,m'-azoxystyrene, hydrozones, and mixtures thereof.

In addition to the above-mentioned catalyst, a curing agent for epoxy resin and a curing catalyst for epoxy resin may be used as a catalyst of this invention.

The amount of the catalyst employed may be less than 5% by weight of total composition.

A variety of additives may be added to the curable composition to impact specific properties provided that they do not impair the essential properties of the resulting resin. Examples of the additives include natural or synthetic resins, fibrous reinforcement, fillers, pigments, dyestuffs, thickening agents, lubricants, flame-retardants and the like.

The curable compositions of this invention are present in a wide range of forms from liquid to solid at room temperature, depending on the natures of the components constituting the composition, and the preliminary reaction conditions. Solid curable composition, liquid curable composition or solution of the composition in solvent may be used according to the use purpose.

The curing conditions of the curable composition of this invention depend on proportion of components constituting the composition and the nature of the components employed. In general, the composition of this invention may be cured by heating it at a temperature within the range of 90°–300° C., preferably 100°–270° C.

When the curable composition of this invention is used for preparing molding, laminate, adhesive-assembly, press means is preferably applied to the molding, laminate or adhesive-assembly in the heat curing step. In general, these products may be pressed at a pressure of 0.1–500 Kg/cm$^2$.

The composition of this invention is rapidly curable and is cured even under mild conditions, so is especially suitable when quantity production and ease of workability are desired. The cured resin made from the composition not only has excellent adhesive force, bond strength, heat resistance, and electric properties, but also is excellent in mechanical properties, such as impact resistance, chemical resistance, moisture resistance and the like. The composition of this invention has a variety of uses as a coating material for rust prevention, flame resistance, flame retardance and the like; as electrical insulating varnish; as adhesive; in laminates to be used for furnitures, building materials, sheathing materials, electrical insulating materials, and the like; and in a variety of moldings.

The present invention is further illustrated by the following non-limiting Examples and Controls. Percent and parts are by weight, unless otherwise specified.

EXAMPLE 1

900 G of 2,2-bis(4-cyanatophenyl)ether was reacted preliminarily with 100 g of bis(4-maleimidophenyl)ether at 150° C. for 90 minutes. The reaction product was mixed intimately with 200 g of a butadiene-acrylonitrile copolymer (acrylonitrile content=15.4%, av. m.w.=2000), then with 0.1 g of azobisisobutyronitrile, 0.5 g of zinc octylate and 0.2 g of triethylenediamine as a catalyst. A coating of the resulting blend was applied to two epoxy resin test panels (125 mm long, 25 mm wide, 0.4 mm thick) and dried with heat to B-stage. The test panels were joined so that the surfaces dried to B-stage contacted each other to provide a 10 mm wide overlap along the longitudinal edge, and the joined panels were heat-cured at 110° C. for 15 hours. The overlapped portion of the panels was 2.0 mm thick and had a shear bond strength of 101.3 Kg/cm$^2$.

EXAMPLE 2

880 G of 1,4-dicyanatobenzene, 96 g of bis(4-maleimidophenyl)methane and 24 g of a mixture of 4-maleimidophenyl-3', 4'-dimaleimidophenylmethane and 4-maleimidophenyl-2',4'-dimaleimidophenylmethane were reacted preliminarily at 160° C. for 50 minutes, and the reaction product was dissolved in a mixture of methyl ethyl ketone and N,N-dimethylformamide. To the solution, 32 g of a butadiene-acrylonitrile copolymer (acrylonitrile content=20.2%, av. m.w.=2200) and 200 g of a novolak type epoxy resin (ECN-1273, produced by Ciba Geigy AG.) were added, and then 0.4 g of zinc octylate, 0.2 g of triethylenediamine and 0.1 g of di-tertiary-butyl perphthalate as a catalyst, and the ingredients were mixed uniformly. A glass cloth was impregnated with the mixture and dried with heat to form B-stage prepregs. Five layers of the prepreg were sandwiched between two electrolytic copper foils each 35μ thick, and pressed at 40 Kg/cm² and 130° C. for 5 hours, then at 50 Kg/cm² and 160° C. for 3 hours to produce a copper-clad laminate. The performance of the laminate is set forth in Table 1 below.

EXAMPLE 3

60 G of a butadiene-acrylonitrile copolymer (acrylic content=8.5%, av. m.w.=2900), 200 g of a bisphenol A type epoxy resin (av. number of intramolecular epoxy groups=2, number av. m.w.=2000) and 200 g of 1,4-dicyanatobenzene were reacted at 150° C. for 350 minutes, and the reaction product was dissolved in a mixture of methyl ethyl ketone and N,N-dimethylformamide. To the solution, 0.2 g of zinc octylate, 0.2 g of triethylenediamine and 0.1 g of benzoyl peroxide were added as a catalyst and mixed uniformly. A copper-clad laminate was prepared from the resulting resin solution in the same manner as in Example 2. The performance of the laminate is set forth in Table 1.

EXAMPLE 4

1000 G of 2,2-bis(4-cyantophenyl)propane was polymerized preliminarily at 150° C. for 400 minutes, and the prepolymer was dissolved in a mixture of methyl ethyl ketone and N,N-dimethylformamide. To the solution, 250 g of butadieneacrylonitrile copolymer (Nipol 1041, produced by Nippon Geon Co., Ltd.) was added, and then 0.4 g of zinc octylate, 0.4 g of triethylene diamine and 0.2 g of benzoyl peroxide were added as a catalyst to form a homogeneous solution. A glass cloth was impregnated with the solution and dried to form B-stage prepregs. A single layer of the prepreg was sandwiched between two electrolytic copper foils each 35μ thick and pressed at 40 Kg/cm² and 170° C. for 120 minutes to provide a copper-clad laminate. The performance of the sheet is set forth in Table 1.

EXAMPLE 5

900 G of 1,3-dicyanatobenzene was reacted with 100 g of bis(4-maleimidophenyl)ether at 150° C. for 120 minutes. The reaction product was dissolved in a mixture of methyl ethyl ketone and N,N-dimethylformamide. To the solution, 200 g of an epoxy resin (ECN-1273, produced by Ciba Geigy AG.) and 500 g of a butadiene-acrylonitrile copolymer (Nipol 1041, produced by Nippon Geon Co., Ltd.) were added to form a homogenous mixture, and then 0.4 g of zinc octylate, 0.4 g of triethylenediamine, 0.4 g of catechol and 0.2 g of benzoyl peroxide were added as a catalyst to form a uniform solution. The solution was impregnated in a glass cloth and dried to form a B-stage prepreg. Web of the prepreg was sandwiched between two electrolytic copper foils each 35μ thick and continuously passed between rolls at 10 Kg/cm² and 130° C. and wound up for after-curing at 170° C. for 100 minutes. The characteristics of the resulting copper-clad laminated sheet are set forth in Table 1.

CONTROL TEST 1

A copper-clad laminated sheet was prepared by repeating the procedure of Example 5 except that no butadiene-acrylonitrile copolymer was used. The characteristics of the sheet are shown in Table 1.

TABLE 1

|  | Ex. 2 | Ex. 3 | Ex. 4 | Ex. 5 | Control Test 1 |
|---|---|---|---|---|---|
| Peel strength of Copper foil (Kg/cm) | 1.8 | 2.2 | 2.0 | 1.8 | 1.65 |
| Glass transition temperature (°C.) | 250 | 200 | 224 | 230 | 240 |
| Hot solder resistance (300° C., 2 min) | no problem | no problem | no problem | no problem | no problem |
| Flexural property (wound about 2.0 mm) | — | — | no problem | no problem | cracking |
| Moisture resistance (in steam at 120° C., 2 atm., 40 hrs) | no problem | no problem | — | — | — |

EXAMPLES 6 TO 10 AND CONTROL TESTS 2-4

1000 Parts of 2,2-bis(4-cyanatophenyl)propane was polymerized preliminarily at 150° C. for 180 minutes to give a pale yellow prepolymer A. 800 Parts of 2,2-bis(4-cyanatophenyl)propane and 200 parts of bis(4-maleimidophenyl)methane were reacted preliminarily at 150° C. for 120 minutes to give a brown prepolymer B. Prepolymers A and B, an acrylonitrileisoprene copolymer having an average molecular weight of 100,000 is referred as C. C and D (a novolak type epoxy resin, ECN-1273, produced by Ciba Geigy AG.) were mixed in the proportions indicated in Table 2, and each mixture was dissolved in a mixture of methyl ethyl ketone and N,N-dimethylformamide, and the catalysts shown in Table 2 were added to the solutions. A glass cloth was impregnated with each solution and dried to form a prepreg. A single layer of the prepreg was sandwiched between two electrolytic copper foils each 35μ thick and pressed at 40 Kg/cm² and 180° C. for 120 minutes. The performance of the resulting copper-clad laminate is set forth in Table 3 below.

TABLE 2

|  | Ex. 6 | Ex. 7 | Ex. 8 | Ex. 9 | Ex. 10 | Cont. 2 | Cont. 3 | Cont. 4 |
|---|---|---|---|---|---|---|---|---|
| A | — | — | — | 50 | — | 100 | — | — |
| B | 90 | 60 | 40 | — | 5 | — | 100 | — |
| C | 10 | 30 | 60 | 50 | 90 | — | — | 100 |
| D | — | 10 | — | — | 5 | — | — | — |
| zinc octylate | 0.015 | 0.010 | 0.010 | 0.017 | 0.005 | 0.020 | 0.017 | 0.005 |
| triethylenediamine | 0.010 | 0.010 | 0.005 | 0.012 | 0.003 | 0.015 | 0.015 | 0.003 |
| benzoyl peroxide | — | — | 0.10 | 0.15 | 0.35 | — | — | 0.12 |

TABLE 3

|  | Ex. 6 | Ex. 7 | Ex. 8 | Ex. 9 | Ex. 10 | Cont. 2 | Cont. 3 | Cont. 4 |
|---|---|---|---|---|---|---|---|---|
| Copper foil peel Strength (Kg/cm) | 1.67 | 1.84 | 2.05 | 2.10 | 1.20 | 1.80 | 1.75 | 0.24 |
| Hot solder resistance (floating at 300° C.) | 120< | 120< | 120< | 120< | 20< | 120< | 120< | two blisters |
| Flexural property* | good | good | good | good | good | broke | broke | good |
| Chemical resistance trichloroethylene | no problem | no problem | no problem | no problem | changed slightly | no problem | no problem | changed greatly |
| methyl ethyl ketone acetone | | | | | | | | |

*The sample was wound about a 1.0 mmφ copper wire to see if it is broken.

EXAMPLE 11

900 G of 2,2-bis(4-cyanatophenyl)propane was reacted with 100 g of bis(4-maleimidophenyl)methane at 150° C. for 150 minutes. To the reaction product, 200 g of an acrylonitrile/butadiene/isoprene terpolymer with an acrylonitrile content of 34 wt% (Nipol DN 1201, produced by Nippon Geon Co., Ltd.), and the mixture was dissolved in methyl ethyl ketone. To the solution, 0.4 g of zinc octylate and 0.2 g of triethylenediamine were added as catalyst to form a uniform mixture. A glass cloth was impregnated with the mixture which was dried to form B-stage prepregs. Six layers of the prepreg were sandwiched between two electrolytic copper foils each 35µ thick and pressed at 40 Kg/cm$^2$ and 175° C. for 120 minutes to form a copper-clad laminate. The laminate had a copper foil peel strength of 1.90 Kg/cm, withstood floating of solder at 350° C. for 3 minutes, and had a glass transition temperature of 220° C. The test sample was freed of the copper foil by etching and immersed in 1,1,1-trichloroethylene, methyl ethyl ketone, 10% HCl and 10% NaCl for 10 minutes. No problem occurred.

EXAMPLE 12

700 G of 1,4-dicyanatobenzene was preliminarily reacted with 300 g of bis(4-maleimidophenyl)ether at 150° C. for 100 minutes. To the reaction product, 200 g of glycidyl methacrylate and 200 g of an acrylonitrile/butadiene/isoprene terpolymer the same as used in Example 11 were added, and the mixture was added to a mixture of methyl ethyl ketone and N,N-dimethylformamide under heating and stirring to form a uniform solution. To the solution, 0.5 g of zinc octylate, 1.0 g of N,N-dimethylbenzylamine and 0.2 g of benzoyl peroxide were added to form a uniform solution. A coating of the resulting solution was applied to a plurality of stainless steel sheets (125 mm long, 25 mm wide, 1 mm thick) in a band 100 mm long along the longitudinal edge, and dried with heat to B-stage, and they were joined so that they overlapped each other at the 10 mm long band, and heat cured at 260° C. for 60 minutes. The overlapped portions of the stainless steel sheets had an initial tensile shear strength of 148 Kg/cm$^2$ which was decreased to 97 Kg/cm$^2$ upon aging in an oven at 260° C. for 50 hours, and to 73 Kg/cm$^2$ upon aging for 100 hours.

EXAMPLE 13

A resin solution prepared by repeating the procedure of Example 12 was impregnated continuously in an aromatic polyamide fabric (Normecs, produced by Du Pont) which was continuously cured by heating at 140° C. to form a long sheet. The sheet could be wound about a 1 mmφ copper wire without breaking, and had an initial insulation resistance of $7 \times 10^{-}$ohms that was decreased to $4.0 \times 10^{12}$ ohms after boiling in water at 100° C. for 2 hours, and to $1.6 \times 10^{12}$ ohms after boiling at 100° C. for 5 hours.

EXAMPLE 14

300 G of a butadiene-acrylonitrile copolymer (acrylonitrile content=15.1%, viscosity=750 poise, average number of OH groups=2.3), 500 g of tris(4-isocyanatophenyl)methane and 200 g of 2-(4-isocyanatophenyl)-5-isocyanatooxazole were reacted preliminarily in N,N-dimethylformamide at 90° C. for 150 minutes. To the resulting solution, 200 g of bis(4-cyanatophenyl)ether and 30 g of bis(4-maleimidophenyl)ether were added, and 0.05 g of zinc octylate and 0.04 g of triethylene diamine were added as catalyst to form a uniform resin solution. A coating of the resin solution was applied to two epoxy resin test panels (125 mm long, 25 mm wide, 0.4 mm thick) and dried with heat to B-stage. The test panels were joined so that the surfaces dried to B-stage contacted each other to provide a 10 mm wide overlap along the longitudinal edge, and the joined panels were heat-cured at 110° C. for 20 hours and at 140° C. for 2 hours. The performance of the overlapped portion of the panels is shown in Table 4 below.

EXAMPLE 15

A resin solution was prepared by repeating the procedure of Example 14 except that 300 g of an epoxy resin (Epikote 1001, produced by Shell Chemical Co., Ltd.). The results of bond testing with the resin solution conducted as in Example 14 are also shown in Table 4.

TABLE 4

|  | Ex. 14 | Ex. 15 |
|---|---|---|
| Bond thickness | 2.00 | 2.00 |
| Shear bond strength (Kg/cm$^2$) | 85.2 | 90.3 |
| Glass transition temperature | 275 | 270 |

TABLE 4-continued

| | Ex. 14 | Ex. 15 |
|---|---|---|
| (°C.) | | |

EXAMPLE 16

700 Parts of 2,2-bis(4-cyanatophenyl)propane was preliminarily reacted with 300 parts of bis(4-maleimidophenyl) methane at 150° C. for 120 minutes. A molten mixture of 850 parts of the reaction product and 150 parts of an acryloyl containing butadiene/acrylonitrile copolymer (VTBNX, produced by Ube Kosan Co., Ltd.) was charged into a mold and heat-cured at 20 Kg/cm² for 120 minutes at 175° C. and for additional 60 minutes at 260° C. to form a casting sheet 2 mm thick. The sheet was cut into pieces (50×50 mm) which were dried at 110° C. for 60 minutes, and cooled by standing in a desiccator, and their weight was measured. They were subsequently heated in an oven at 300° C. for a given period to measure any loss in their weight due to heating. The results are graphed in FIG. 1.

CONTROL TESTS 5 AND 6

Figure 1:
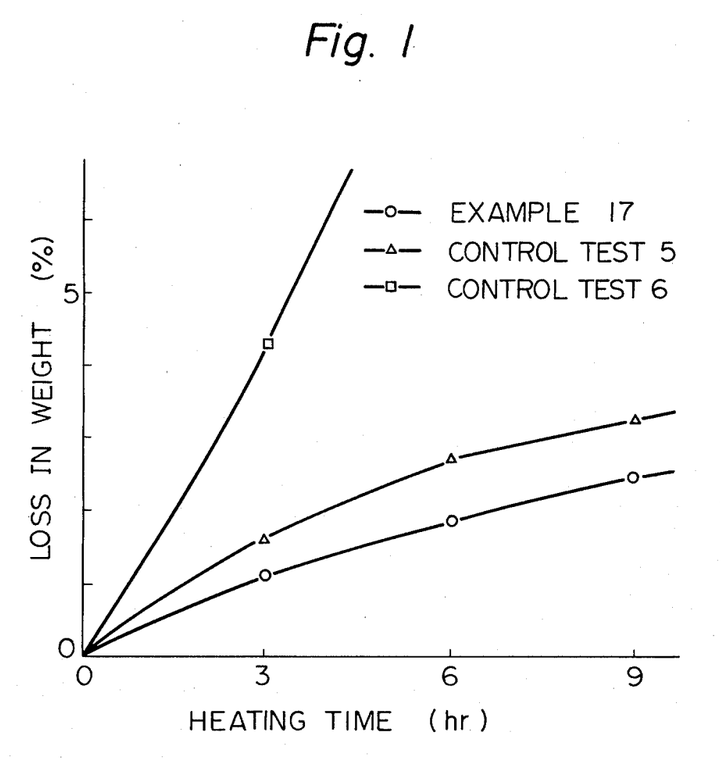
FIG. 1 is a graph that shows the profile of weight loss due to heating of the test pieces of Example 17 and control tests 5 and 6 when they were heated in an oven at 300° C. for a given period.

As in Example 16, 2,2-bis(4-cyanatophenyl)propane and bis(4-maleimidophenyl)methane were preliminarily reacted, and to 850 g of the reaction product, 150 g of a modified polybutadiene (BF-1000, produced by Nippon Soda Co., Ltd.) prepared by treating 1,2-polybutadiene to introduce an epoxy group (Control Test 5) and 150 parts of 1,2-polybutadiene modified with a hydantoin type epoxy resin (CY 350, produced by Ciba Geigy AG.) (Control Test 6) were added. Each blend was heat-cured to make a casting. The casting was likewise heated in an oven at 300° C. and the loss in its weight was measured. The results are depicted in FIG. 1.

EXAMPLE 17

900 Parts of 2,2-bis(4-cyanatophenyl)propane was preliminarily reacted with 100 parts of bis(4-maleimidophenyl)methane at 150° C. for 60 minutes. 750 G of the resulting resin product was mixed with 250 g of an acryloyl-containing butadiene/acrylonitrile copolymer (the same as used in Example 16) to effect a preliminary reaction at 120° C. for 30 minutes. A coating of the reaction product was applied to a soft steel plate and preliminarily dried at 130° C. for 5 minutes, and an adherent was attached to the steel plate in compliance with JIS K6850 and dried at 130° C. for 5 minutes and heat-cured at 0.9 Kg/cm² for 120 minutes at 175° C. The resulting tensile test piece was aged in an oven at 260° C. to check any reduction in the tensile shear strength. The results are shown in Table 5 below.

CONTROL TEST 7

A tensile test piece was prepared as in Example 16 except that the acryloyl-containing butadiene/acrylonitrile copolymer (VTBNX, produced by Ube Kosan Co., Ltd.) was replaced by 250 g of hydantoin type epoxy resin modified polybutadiene (CY-350, produced by Ciba Geigy AG.). The test piece was aged in an oven at 260° C. to check any reduction in the tensile shear strength. The results are shown in Table 5.

EXAMPLE 18

870 Parts of 1,4-dicyanatobenzene was preliminarily reacted with 130 parts of bis(4-maleimidophenyl)ether at 150° C. for 120 minutes. 1000 G of the reaction product, 200 g of an epoxy resin (ECN-1273, produced by Ciba Geigy AG.) and 300 grams of an acryloyl-containing butadiene/acrylonitrile copolymer the same as used in Example 16 were added, and the mixture was dissolved in methyl ethyl ketone. To the solution, 0.4 g of zinc octylate, 0.2 g of triethylenediamine and 0.5 g of dicumyl peroxide were added and a uniform mixture was formed by stirring. A glass cloth was impregnated with the mixture and then dried to form a B-stage prepreg. Eight layers of the prepreg were sandwiched between two electrolytic copper foils each 35μ thick and pressed at 40 Kg/cm² for 120 minutes at 175° C. and then at 50 Kg/cm² for 120 minutes at 220° C. to form a copper-dried laminate. The performance of the laminate is set forth in Table 6 below.

TABLE 5

| | | Ex. 17 | Cont. 7 |
|---|---|---|---|
| Tensile shear strength (Kg/cm²) | aged in oven at 260° C. initial | 294 | 194 |
| | after 50 hours | 151 | 70 |

TABLE 6

| | | Ex. 18 |
|---|---|---|
| Peel strength of copper foil (Kg/cm) | 25° C. | 1.80 |
| | 100° C. | 1.76 |
| | 180° C. | 1.65 |
| Barcol hardness | 25° C. | 70 |
| Flexural strength (Kg/mm²) | 25° C. | 55 |
| | 100° C. | 50 |
| | 180° C. | 44 |
| Water absorption (E-24/50 +-D-24/23) (%) | | 0.10 |
| dielectric constant (25° C., 1 MHz) | | 4.0 |
| dielectric dissipation factor (25° C., 1 MHz) | | 0.0071 |
| chemical resistance (immersed for 2 hours) | 5% NaOH | no problem |
| | 5% HCl | " |
| | trichloroethylene | " |
| | acetone | " |
| | n-propyl alcohol | " |
| | m-xylene | " |
| | n-heptane | " |

EXAMPLE 19

A mixture of 1000 g of a butadiene-acrylonitrile copolymer acrylonitrile content=15.4%, ave. m.w.=2000, 1,2-bond in butadiene=14%), 200 g of maleic anhydride, 2 g of Antigen 3C (anti-gelling agent of Sumitomo Chemical Co., Ltd.) and 10 g of xylene was charged into a 3-liter separable flask with a reflux condenser. After the flask was purged with nitrogen, reaction was conducted at 198° C. for 4 hours. After completion of the reaction, the solvent and unreacted substance were distilled off under vacuum to provide a butadiene-acrylonitrile copolymer modified with maleic anhydride. 500 Parts of 2,2-bis(4-cyanatophenyl)propane was subjected to preliminary reaction at 150° C. for 450 minutes. the propane was then reacted with 200 parts of the modified butadiene-acrylonitrile copolymer at 150° C. for 20 minutes. To the reaction mixture, 0.1 part of zinc octylate and 0.1 part of triethylene diamine were added and dissolved in a mixture of methyl ethyl ketone and N,N-dimethylformamide. A carbon fiber cloth was impregnated with the resulting solution and dried to form a B-stage prepreg. A single layer of the prepreg was sandwiched between stainless steel sheets 35μ thick that had been ground with sand paper, washed with trichlene, treated with an epoxy silane coupling agent and dried at 100° C. for 30 minutes. The sandwiched prepreg was pressed at 40 Kg/cm² and 175° C. for 140 minutes. The performance of the resulting stainless steel-clad laminate is described in Table 7.

EXAMPLE 20

900 Parts of 2,2-bis(4-cyanatophenyl)propane was preliminarily reacted with 100 parts of bis(4-maleimidophenyl)methane at 140° C. for 150 minutes. To the reaction mixture, 200 parts of an epoxy resin (ECN-1273 produced by Ciba Geigy AG.), 400 parts of the modified acrylonitrile-butadiene copolymer of Example 19, and a catalyst comprising 0.1 part of zinc octylate, 5.0 parts of N,N-dimethylbenzylamine and 2.0 parts of ditertiary butyl peroxide were added and dissolved in methyl ethyl ketone. A glass fiber cloth was impregnated with the solution and dried to form a B-stage prepreg. A single layer of the prepreg was sandwiched between electrolytic copper foils 35μ thick and pressed at 40 Kg/cm² at 175° C. for 170 minutes to produce a copper-clad laminate. The performance of the laminate is set forth in Table 7 below.

CONTROL TESTS 8 AND 9

Copper-clad laminates were prepared as in Examples 19 and 20 except no acrylonitrile-butadiene copolymer modified with maleic anhydride was used. The performance of the laminates is set forth in Table 7.

TABLE 7

|  |  | Ex. 19 | Ex. 20 | Cont. 8 | Cont. 9 |
|---|---|---|---|---|---|
| Peel strength of copper foil (Kg/cm) | A | 1.20 | 2.10 | 1.15 | 1.74 |
|  | S₄ | 1.15 | 2.00 | 1.10 | 1.81 |
| Glass transition temperature (°C.) |  | 222 | 209 | 232 | 241 |
| Flexural property |  | no problem | no problem | broke | broke |
| chemical resistance (immersed for 5 minutes) | trichlene | no problem | no problem | no problem | no problem |
|  | methylene | | | | |
|  | MEK | | | | |
|  | acetone | | | | |
|  | toluene | | | | |
|  | gasoline | | | | |

Notes:
1. Flexural property was evaluated by seeing if the sample wound about a 1.0 mmφ copper wire broke one minute later.
2. Chemical resistance was evaluated by visually observing any change in the sample immersed in a specific chemical.

EXAMPLES 21 TO 23 AND CONTROL TESTS 10-12

Prepolymer A was prepared by subjecting 1000 parts of 2,2-bis(4-cyanatophenyl)propane at 150° C. for 400 minutes. Prepolymer B was prepared by preliminarily reacting 900 parts of 2,2-bis(4-cyanatophenyl)-propane with 100 parts of bis(4-maleimidophenyl)methane at 150° C. for 150 minutes. Prepolymer C was prepared in the following manner: A mixture of 1000 parts of an acrylonitrile/butadiene/isoprene terpolymer (acrylonitrile content=15 wt%, butadiene content=70 wt%, isoprene content=15 wt%, number ave. m.w.=2000), 192 parts of maleic anhydride, 2 parts of Antigen 3C (anti-gelling agent produced by Sumitomo Chemical Co., Ltd.) and 15 parts of xylene was charged into a 3-liter separable flask with a reflux condenser. After purging the flask with nitrogen, the mixture was subjected to reaction at 200° C. for 6 hours. After completion of the reaction, the solvent and the unreacted substance were distilled off under vacuum to produce an acrylonitrile/butadiene/isoprene terpolymer modified with maleic anhydride. Component D was an epoxy resin (ECN-1273, produced of Ciba Geigy AG.). The four components were mixed in the proportions noted in Table 8. Each blend was dissolved in a mixture of methyl ethyl ketone and N,N-dimethylformamide together with the catalysts indicated in Table 8. A glass fiber cloth was impregnated with the solution and dried to form a B-stage prepreg. A single layer of the prepreg was sandwiched between electrolytic copper foils 35μ thick and pressed at 40 Kg/cm² and 175° C. for 150 minutes. The performance of the resulting laminates is shown in Table 9 below.

TABLE 8

| Composition of Resin Blend | | | | | | |
|---|---|---|---|---|---|---|
|  | Ex. 21 | Ex. 22 | Ex. 23 | Cont. 10 | Cont. 11 | Cont. 12 |
| A | 90 | — | — | 100 | — | — |
| B | — | 60 | 20 | — | 100 | — |
| C | 10 | 40 | 70 | — | — | 100 |
| D | — | — | 10 | — | — | — |
| zinc octylate | 0.030 | 0.015 | 0.008 | 0.030 | 0.020 | 0.015 |
| triethylene diamine | 0.020 | 0.015 | 0.008 | 0.020 | 0.015 | 0.015 |

TABLE 9

|  |  | Ex. 21 | Ex. 22 | Ex. 23 | Cont. 10 | Cont. 11 | Cont. 12 |
|---|---|---|---|---|---|---|---|
| Peel strength of copper foil (Kg/cm) | A | 1.95 | 1.99 | 2.10 | 1.88 | 1.78 | 0.35 |
|  | S₄ | 1.90 | 1.92 | 1.85 | 1.90 | 1.80 | 0.20 |
| Flexural property* |  | no problem | no problem | no problem | broke | broke | no problem |
| Dielectric constant (1 MHz) |  | 3.8 | 3.7 | 3.5 | 4.0 | 4.2 | 3.3 |
| chemical resistance (immersed for 10 min.) | trichlene | no problem | no problem | no problem | no problem | no problem | no problem |
|  | methylene chloride |  |  |  |  |  | no problem |
|  | methyl ethyl ketone |  |  |  |  |  | changed slightly |
|  | acetone |  |  |  |  |  | changed |

TABLE 9-continued

| | Ex. 21 | Ex. 22 | Ex. 23 | Cont. 10 | Cont. 11 | Cont. 12 |
|---|---|---|---|---|---|---|
| N,N—dimethyl formamide | | | | | slightly changed | changed greatly |

*The sample was wound about a 1.0 mmφ copper wire to see if it broke.

EXAMPLE 24

500 Parts of an OH-containing acrylonitrile/butadiene/isoprene terpolymer (ave. number of OH groups=2.7, number ave. m.w.=5000) was dissolved under stirring in 500 parts of methyl ethyl ketone in a 3-liter separable flask with a reflux condenser. To the solution, 7 parts of xylylene diisocyanate was added to effect reaction at 50° C. for 3 hours. To the reaction product, 900 parts of component B obtained as in Examples 21 to 23, as well as 0.1 part of zinc octylate and 0.1 part of triethylenediamine (as catalyst) were added. The resulting mixture was used for bonding stainless steel test pieces 1 mm thick according to JIS K 6850 by curing the mixture at 150° C. for 100 minutes, then at 200° C. for 60 minutes. Throughout the curing, the pressure was maintained at 0.9 Kg/cm². The adhesive layer had a shear bond strength of 149 Kg/cm².

EXAMPLE 25

A mixture of 200 parts of a carboxyl-containing acrylonitrile/butadiene/isoprene terpolymer (ave. number of carboxyl groups=4.0, number ave. m.w.=20000) and 10 parts of an epoxy resin (Epikote, product of Shell International Chemical Corp.) was subjected to preliminary reaction at 130° C. for 100 minutes. To the reaction product, 900 parts of component A obtained as in Examples 21 to 23, as well as 0.1 part of zinc octylate and 0.1 part of N,N-dimethylbenzylamine (as catalyst) were added and stirred to form a uniform mixture. The mixture was spread on an iron plate in a thickness of 2 to 5μ and cured at 110° C. for 30 minutes, then at 140° C. for 60 minutes and finally at 175° C. for 60 minutes to obtain a coating. The coating had a pensil hardness of 4H and cross cut of 100/100.

EXAMPLE 26

Into a 3-liter separable flask equipped with reflux condenser were charged 500 parts of acrylonitrile-butadieneisoprene terpolymer containing hydroxy groups employed in Example 24, 38 parts of glycidyl methacrylate and 1.5 parts of N-methylformalin and the mixture was preliminarily reacted at 100° C. for 6 hours to obtain acrylonitrile-butadiene-isoprene terpolymer containing methacryloyl groups.

The above terpolymer, components B (500 parts) and D (100 parts) of Examples 21–23 and 0.1 part of zinc octylate and 0.05 parts of triethylenediamine as a catalyst were charged into a mold and cured at 110° C. and 40 Kg/cm² for 120 minutes, then at 160° C. for 120 minutes and finally at 200° C. for 60 minutes to obtain a molded plate 3.0 mm thick. After the plate was heated at 280° C. for 3 hours, the loss of weight was 0.92%.

What is claimed is:

1. A curable resin composition comprising:
   (a) at least one cyanate ester compound selected from the group consisting of:
   (1) a polyfunctional aromatic cyanate ester monomer having the formula:

wherein m is 2 to 5 and R is an aromatic organic group, the cyanate groups being bonded to an aromatic ring of said aromatic organic group,
   (2) a prepolymer of (1), and
   (3) a coprepolymer of (1) and an amine; and
   (b) at least one polymeric material selected from the group consisting of:
   (1) a terpolymer of acrylonitrile, butadiene, and isoprene,
   (2) a copolymer of acrylonitrile and butadiene or isoprene,
   (3) a reaction product of (1) or (2) and a compound selected from the group consisting of an isocyanate compound, an epoxy compound, an acrylate, a methacrylate and an unsaturated acid anhydride, and
   (4) the product formed by modifying (1) or (2) by introducing a methacryloyl group, an acryloyl group or an acid anhydride moiety thereinto,
   said composition including a mixture of components (a) and (b), a preliminary reaction product of components (a) and (b), or the combination of said mixture and said preliminary reaction product.

2. The composition as defined in claim 1 wherein the cyanate ester is selected from the group consisting of 1,3-, 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane; 2,2-bis(3,5-dichloro-4-cyanatophenyl)propane; 2,2-bis(3,5-dibromo-4-dicyanatophenyl)propane; bis(4-cyanatophenyl) ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak produced by reacting a novolak with cyanogen halide; cyanated bisphenol polycarbonate oligomer produced by reacting a bisphenol polycarbonate oligomer with cyanogen halide; and mixtures thereof.

3. The composition as defined in claim 1 wherein component (b) is selected from the group consisting of a terpolymer of acrylonitrile, butadiene and isoprene and a copolymer of acrylonitrile and butadiene or isoprene.

4. The composition as defined in claim 1 wherein component (b) is selected from the group consisting of the products formed by modifying (1) or (2) by introducing a methacryloyl group, an acryloyl group or an acid anhydride moiety thereinto.

5. The composition as defined in claim 4 wherein component (b) is obtained by reacting the copolymer or terpolymer having a hydroxide group, a carboxylic group, an epoxy group or an isocyanate group at its end and/or side position with a compound represented by the formula:

wherein X is methyl or hydrogen; Y is halogen, a hydroxy group, or an organic group having a functional group selected from the group consisting of carboxy, hydroxy, epoxy, amino and isocyanate in which the organic group bonds to the acryloyl or methacryloyl group through an ether bond, ester bond, urea bond or amide bond, and l is 1, 2 or 3.

6. The composition as defined in claim 1 wherein component (b) is used in an amount of 1–95% by weight on the basis of total weight of components (a) and (b).

7. A curable resin composition comprising:
(a) at least one cyanate ester compound selected from the group consisting of:
 (1) a polyfunctional aromatic cyanate ester monomer having the formula:

wherein m is 2 to 5 and R is an aromatic organic group, the cyanate groups being bonded to an aromatic ring of said aromatic organic group,
 (2) a prepolymer of (1), and
 (3) a coprepolymer of (1) and an amine;
(b) at least one polymeric material selected from the group consisting of:
 (1) a terpolymer of acrylonitrile, butadiene, and isoprene,
 (2) a copolymer of acrylonitrile and butadiene or isoprene,
 (3) a reaction product of (1) or (2) and a compound selected from the group consisting of an isocyanate compound, an epoxy compound, an acrylate, a methacrylate and an unsaturated acid anhydride, and
 (4) the product formed by modifying (1) or (2) by introducing a methacryloyl group, an acryloyl group or an acid anhydride moiety thereinto,
(c) at least one compound selected from the group consisting of:
 (1) a polyfunctional maleimide,
 (2) a prepolymer of (1), and
 (3) a coprepolymer of (1) and an amine, said composition including a mixture of components (a), (b) and (c), a preliminary reaction product of components (a), (b) and (c), the combination of said mixture and said preliminary reaction product, the combination of (a) and the preliminary reaction product of (b) and (c), the combination of (b) and the preliminary reaction product of (a) and (c), or the combination of (c) and the preliminary reaction product of (a) and (b).

8. The composition as defined in claim 7 wherein the cyanate ester is selected from the group consisting of 1,3-, 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane; 2,2-bis(3,5-dichloro-4-cyanatophenyl)propane; 2,2-bis(3,5-dibromo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak produced by reacting a novolak with cyanogen halide; cyanated bisphenol polycarbonate oligomer produced by reacting a bisphenol polycarbonate oligomer with cyanogen halide; and mixtures thereof.

9. The composition as defined in claim 7 wherein component (b) is selected from the group consisting of a terpolymer of acrylonitrile, butadiene and isoprene and a copolymer of acrylonitrile and butadiene or isoprene.

10. The composition as defined in claim 7 wherein component (b) is selected from the group consisting of the products formed by modifying (1) or (2) by introducing a methacryloyl group, acryloyl group or an acid anhydride moiety thereinto.

11. The composition as defined in claim 10 wherein component (b) is obtained by reacting the copolymer or terpolymer having a hydroxide group, a carboxylic group, an epoxy group or an isocyanate group at its end and/or side position with a compound represented by the formula:

wherein X is methyl or hydrogen; Y is halogen, a hydroxy group, or an organic group having a functional group selected from the group consisting of carboxy, hydroxy, epoxy, amino and isocyanate in which the organic group bonds to the acryloyl or methacryloyl group through an ether bond, ester bond, urea bond or amide bond, and l is 1, 2 or 3.

12. The composition as defined in claim 7 wherein the polyfunctional maleimide is selected from the group consisting of 1,3- or 1,4-dimaleimide benzene, 1,3- or 1,4-bis(maleimidemethylene)benzene, 1,3- or 1,4-dimaleimide cyclohexane, 1,3- or 1,4-bis(maleimidemethylene)cyclohexane, 4,4'-dimaleimide biphenyl, bis (4-maleimidephenyl)methane, bis(4-maleimidephenyl) ether, bis(4-maleimidephenyl)sulfone, bis(4-maleimide-3-methylphenyl)methane, bis(4-maleimide-3-chlorophenyl)methane, bis(4-maleimide-3,5-dimethylphenyl)methane, 2,2-bis(4-maleimide-3-methylphenyl)propane, 2,2-bis(4-maleimide-3,5-dibromophenyl) propane, bis(4-maleimidephenyl)phenylmethane, 3,4-dimaleimidephenyl-4'-maleimidephenylmethane, 1,1-bis(4-maleimidephenyl)-1-phenyl-methane, and maleimide derived from melamine and, addition product of formalin and an aniline in which benzene rings of two or more aniline bond through methylene group.

13. The composition as defined in claim 7 wherein component (b) is used in an amount of 1–95% by weight on the basis of total weight of components (a), (b) and (c).

* * * * *